United States Patent [19]
Fix et al.

[11] Patent Number: 5,649,895
[45] Date of Patent: Jul. 22, 1997

[54] STABILIZATION OF HEAVY METALS IN ASH

[75] Inventors: Kathleen Ann Fix; Mark Gerard Kramer, both of Landing, N.J.

[73] Assignee: Ashland Inc., Columbus, Ohio

[21] Appl. No.: 601,484

[22] Filed: Feb. 14, 1996

[51] Int. Cl.$^6$ .................................. A62D 3/00; B09B 3/00
[52] U.S. Cl. ......................................... 588/256; 588/901
[58] Field of Search ............................ 588/18, 252, 256, 588/901; 210/751

[56] References Cited

U.S. PATENT DOCUMENTS

| | | | |
|---|---|---|---|
| 4,943,377 | 7/1990 | Legare, III | 210/709 |
| 5,259,975 | 11/1993 | Mohn | 210/751 X |
| 5,264,135 | 11/1993 | Mohn | 588/256 X |
| 5,403,496 | 4/1995 | Kramer et al. | 588/256 X |
| 5,536,899 | 7/1996 | Forrester | 588/256 |

*Primary Examiner*—George A. Suchfield
*Attorney, Agent, or Firm*—David L. Hedden

[57] ABSTRACT

This invention relates to a process for stabilizing heavy metals in ash. The steps of the process include: (a) preparing an aqueous slurry of ash and water; (b) decreasing the pH of the aqueous slurry to less than about 5.0 in the presence of an iron salt; (c) treating the aqueous slurry with (1) an organo sulfur containing compound, (2) an alkaline extract of peat moss, and (3) an alkaline earth metal containing compound. Heavy metals in ash treated by this process will not leach into the environment.

9 Claims, No Drawings

STABILIZATION OF HEAVY METALS IN ASH

FIELD OF THE INVENTION

This invention relates to an improved stabilization of heavy metals in ash which are generated by burning fuels. Of particular interest is the stabilization of ash generated from foundry cupolas.

BACKGROUND OF THE INVENTION

Boilers, incinerators, furnaces and other devices burn fuels of various types, e.g. coal, garbage and other wastes, metal, coke, etc. Ash is one of the by products of such burning. Some of the ash, known as fly ash, collects on the insides of pipes or chimneys of the burner while bottom ash collects on the grate at the bottom of the burner. Cupola ash is produced by the smelting of ferrous and non ferrous metals by burning coke and/or coal in cupolas to form ingots at temperatures exceeding 1000° C.

Depending upon the source of ash, it may contain metals such as arsenic, barium, chromium, cadmium, lead, mercury, selenium, and silver which may leach or otherwise enter into the environment. Metals of particular concern are heavy metals such as lead and cadmium metals which are prone to leach under acid conditions. Their toxicity with respect to human animal life is also of concern.

As a result of the enactment of the Resource Conservation Recovery Act (RCRA), the disposal of wastes containing such metals is subject to the EPA Toxicity Characteristic Leaching Procedure (TCLP) test. Under this act, ash is a solid waste subject to the TCLP test which serves as one of the criteria for distinguishing between hazardous and non-hazardous wastes. If a waste solid is determined to be hazardous, it must be disposed of according to more stringent regulations which adds costs to the products which produce these wastes as by-products.

According to the TCLP test, the sample is acidified, then, followed by instrumental analysis to measure the concentrations of any metallic ion that may have been leached from the sample. It is difficult for wastes containing metals to pass the test because metals have a tendency to resolubilize under acidic conditions and the TCLP test is carried out under such conditions.

Typically, the metals in ash are stabilized by forming an aqueous slurry of water and ash. The aqueous slurry is treated with lime (calcium hydroxide) to precipitate metal hydroxide solids out of solution and entrap them in cement which forms when the slurry dries. However, such treatment does not permanently prevent the leaching of the metals if they are exposed to an acidic environment over time. Therefore, there is a need to develop improved means which effectively stabilize the metals indefinitely.

U.S. Pat. No. 5,264,135 discloses a process for treating wastewater sludge which is removed from metal-bearing wastewater. The metals are in the form of metal hydroxide precipitates because the pH of the sludge is alkaline, typically 7–9. The sludge is treated with diethylcarbamate, dimethyldithiocarbamate, and sodium trithiocarbonate, or salts thereof, to stabilize the metal hydroxide precipitates in the sludge, reducing their propensity to redissolve and leach into the environment under acidic leaching conditions.

SUMMARY OF THE INVENTION

This invention relates to a process for stabilizing heavy metals, such as cadmium and lead, in ash which comprises:

(a) preparing an aqueous slurry of ash and water;
(b) decreasing the pH of said aqueous slurry to less than about 5.0 in the presence of an iron salt;
(c) treating said aqueous slurry with
  (1) an organo sulfur containing compound selected from the group consisting of thiocarbamates, thiocarbonates, trimercaptotriazine, salts thereof, and mixtures thereof in an amount effective to stabilize any residual metals remaining after step (b),
  (2) an alkaline extract of peat moss, and
  (3) an alkaline earth metal containing compound, such that the weight ratio of iron salt to organo sulfur compound is from 5.0:1.0 to 1.0:5.0, the weight ratio of alkaline earth metal containing compound to organo sulfur compound is from 1.0:20.0 to 20.0:1.0, the weight ratio of alkaline extract of peat moss to organo sulfur compound is from 1:5 to 5:1, and the weight ratio of organic sulfur compound to ash to be treated is from 0.25:1000 to 40:1000.

Heavy metals in ash treated by this process will not leach into the environment, and the treated ash will pass the TCLP test. Thus the treated ash will be classified as non hazardous. Consequently, the ash can be disposed of less stringently with less expense.

This process differs from the process in U.S. Pat. No. 5,264,135 described previously because it is concerned with stabilizing the metals found in ash rather than wastewater sludge which is removed from metal-bearing wastewater. The most important difference, however, is that in this process for the stabilization of ash, the pH of the slurry is acidic when the organo sulfur compound is added to the slurry. In U.S. Pat. No. 5,264,135, the pH of the sludge is from 7–9 before the organic sulfur compound is added to the sludge. Consequently, the metals in the slurry containing the ash will be in their ionic state rather than as metal hydroxide precipitates which is the case in the process disclosed in U.S. Pat. No. 5,254,135 where wastewater sludge is treated.

Additionally, the subject invention involves the co-treatment of the ash with both an organic sulfur containing compound, an alkaline earth metal containing compound, preferably magnesium hydroxide and magnesium oxide, and alkaline extract of peat moss.

DETAILED DESCRIPTION OF THE INVENTION

The invention relates to the use of organo sulfur containing compounds to stabilize heavy metals (e.g. cadmium and lead) found in ash, particularly ash from foundry cupolas, so that the ash will pass TCLP testing. Organo sulfur containing compounds which will stabilize ash include organo sulfur containing compounds selected from the group consisting of thiocarbamates, thiocarbonates, trimercaptotriazines, alkali or alkaline earth metal salts thereof, and mixtures thereof, preferably dimethyldithiocarbamate, diethyldithiocarbamate, polythiocarbonate, alkali metal salts thereof, trisodium trimercaptotriazine, and mixtures thereof. The amount of the organo sulfur compound used is an amount effective to stabilize any residual metals remaining after treatment with the iron salt, generally this is from 1 weight percent to 12 weight percent based upon the weight of the ash to be treated, preferably from 2 weight percent to 6 weight percent based upon the weight of the ash to be treated.

Preferably used as the iron salts in the process are ferrous sulfate, ferric sulfate, ferrous chloride, ferric chloride, preferably ferric sulfate. The amounts of iron salt is such that the weight ratio of iron salt to organo sulfur compound is preferably from 5.0:1.0 to 1.0:5.0, more preferably 3.0:1.0 to 1.0:3.0. increased amounts of iron salt can be used without detrimental effect on the process, but the costs of the process will be increased. Preferably, after the preferred amount of iron salt is added to the mixture, a commodity acid, such as phosphoric acid, hydrochloric acid, or sulfuric acid, preferably phosphoric, will be used to lower the pH to 4–5 if the addition of the iron salt has not already done this.

Preferably the alkaline earth metal containing compound is selected from the group consisting of magnesium oxide, magnesium hydroxide, calcium oxide, calcium hydroxide, and mixtures thereof. Most preferably used as the alkaline earth metal containing compound is magnesium hydroxide or magnesium oxide. The weight ratio of alkaline earth metal containing compound to organo sulfur compound is from 1.0:20.0 to 20.0:1.0, preferably 1.0:5.0:5.0:1.0.

The alkaline peat moss extract is a liquid and comprises humic acid, fulvic acid, a blend of humic acid and fulvic acid, and salts thereof. The weight ratio of alkaline peat moss extract to organo sulfur compound is from 1:5 to 5:1., preferably from 1:2 to 2:1.

The weight ratio of organo sulfur compound to ash to be treated is from 0.25:1000 to 40:1000, preferably 2.5:1000 to 20:1000.

After the ash is treated by the process, the metal ions are less soluble when exposed to an acidic medium. When the reactants are used under the proper conditions, it is believed that the metal ions become fixed (a physical binding or immobilization of the metals) in the aggregate which results after the treated slurry of ash is cured. Additionally, stabilization or buffering against the acidic conditions, is accomplished by pH control. This gives additional protection against metals solubilizing under acidic conditions.

It should be apparent that the process does not remove the metals from the treated ash. Instead it contains the metals in the aggregate which results from treating the ash by the process.

A preferred general process for stabilizing the metals in ash is as follows:

1. Add 1000 parts ash (typically cupola) consisting of a mixture of bottom ash and fly ash having a weight ratio of 0:100 to 70:30, preferably about 50:50, to a batch mixer tank.
2. Add enough water to make an ash/water slurry (from 5 weight percent to 150 weight percent, preferably 15 to 21 weight percent, of water based upon the weight of the ash).
3. Add an iron salt (from 2 weight percent to 6 weight percent, based upon the weight of the ash to be treated), and if necessary a commodity acid, for instance sulfuric acid, hydrochloric acid, or preferably phosphoric acid, over a period of about 5 minutes to reduce the pH of the slurry to 4.0 to 5.0, preferably 4.5 to 5.0.
4. Add the organo sulfur containing compound (AMERSEP MP-3R) and alkaline peat moss extract (OCA 15-400), both in amounts of 0.25% to 10% based upon the ash to be treated.
5. Add an alkaline earth metal hydroxide over a period of several minutes (generally 5 minutes to 10 minutes). Sufficient alkaline earth metal containing compound is added to preferably raise the pH to at least 7.5. Typically, the organo sulfur containing compound is added first and then the alkaline earth metal hydroxide is added, and mixing is continued for several minutes until the mixture is uniform.
6. Mix the slurry and reagents until they are uniform, typically for approximately 5 to 10 minutes, and allow the treated mixture to cure for about 18 hours or until a hardened aggregate results.

After the treatment process, the concentration of unstabilized metals in the cured mixture is measured according to the TCLP test to determine if the levels are below the required concentrations.

In some applications, it is desirable to add lime to raise the pH of the slurry to facilitate a buffer against the effects of acid rain. Sufficient lime is added to the slurry after it is treated with the organic sulfur containing compound and magnesium oxide and/or magnesium hydroxide to raise the pH to about 9–11. The lime is typically added over a period of 5 to 10 minutes until the mixture is uniform. In such cases the slurry is mixed until it is uniform, typically for about 5 to 10 minutes.

The EPA Toxicity Characteristic Leaching Procedure (TCLP) test is described in Test Method 1311, Federal Register, Mar. 29, 1990, revised Jun. 29, 1990, and is herein incorporated by reference. Essentially, TCLP leach testing involves exposing a sample to an severe acidic conditions which accelerate the leaching process. The leaching process takes approximately 18 to 24 hours for TCLP. Samples which have concentrations of metals below the concentration levels established by the TCLP test are classified as non hazardous. Consequently, they can be disposed of less stringently with less expense.

ABBREVIATIONS

AS MP-3R—AMERSEP® MP-3R Metals Precipitant which is 40–55% by weight sodium dimethyldithiocarbamate in water.

AS 5320—AMERSEP® 5320 Coagulant which is liquid ferric sulfate at a 40 to 50 weight percent concentration in water with about 1 weight percent sulfuric acid.

OCA 15-400—OCA 15-400, sold by Organic Products Company, Inc., is an alkaline extract of peat moss which comprises a liquid blend of extracts such as humic acid and fulvic acids. The CAS# for OCA 15-400 is 1415-93-6.

MgO—magnesium oxide.

EXAMPLES

The test procedure used in the following examples is as follows:

A one kilogram sample of combined fly ash and bottom ash was treated as follows:

1. Add 300 ml of water to the ash sample, mix one minute.
2. Add 2% by weight AMERSEP 5320 and mix one minute.
3. Add Drew OCA 15-400 and AMERSEP MP-3R in amounts as set forth in Table I and mix one minute.
4. Add 2% by weight of MgO and mix seven minutes.
5. Ship to outside laboratory for TCLP testing.

Results of treatment are summarized in Table I which follows.

TABLE I

| Example | Additive (% by weight) | | Heavy Metals (ppm) | |
|---|---|---|---|---|
| | OCA 15-400 | MP-3R | Cadmium | Lead |
| Control | 0 | 0 | 1.46 | 1.03 |
| 1 | 0 | 2 | 0.044 | 0.48 |
| 2 | 1 | 0 | 0.067 | 0.36 |
| 3 | 2 | 0 | 0.064 | 0.33 |

TABLE I-continued

| | Additive (% by weight) | | Heavy Metals (ppm) | |
|---|---|---|---|---|
| Example | OCA 15-400 | MP-3R | Cadmium | Lead |
| 4 | 1 | 2 | 0.061 | 0.36 |
| 5 | 2 | 2 | 0.067 | 0.33 |

The results in Table I show that cadmium and lead levels in the extraction of fluid are significantly reduced with the addition of OCA 15-400. On the other hand, no synergistic effect is noted when MP-3R is mixed with OCA 15-400.

We claim:

1. A process for stabilizing metals in ash which comprises:
   (a) preparing an aqueous slurry of ash and water;
   (b) decreasing the pH of said aqueous slurry to less than about 5.0 in the presence of an iron salt to ionize the metals in the slurry;
   (c) treating said aqueous slurry with
      (1) an organo sulfur containing compound selected from the group consisting of thiocarbamates, thiocarbonates, trimercaptotriazine, salts thereof, and mixtures thereof in an amount effective to stabilize any residual metals remaining after step (b),
      (2) an alkaline peat moss extract, and
      (3) an alkaline earth metal containing compound selected from the group consisting of magnesium oxide, magnesium hydroxide, calcium oxide, calcium hydroxide, and mixtures thereof, and
   such that the weight ratio of iron salt to organo sulfur compound is from 5.0:1.0 to 1.0:5.0, the weight ratio of alkaline earth oxide to organo sulfur compound is from 1.0:20.0 to 20.0:1.0, the weight ratio of alkaline peat moss extract to organo sulfur compound is from 5:1 to 1:5, and the weight ratio of organo sulfur compound to ash to be treated is from 0.25:1000 to 40:1000.

2. The process of claim 1 wherein the pH of step (b) is decreased to a range of about 4 to about 5 and the weight of the organo sulfur compound is from 2 weight percent to 6 weight percent based upon the weight of the ash to be treated.

3. The process of claim 2 wherein the iron salt is selected from the group consisting of ferrous chloride, ferric chloride, ferrous sulfate, ferric sulfate, and mixtures thereof.

4. The process of claim 3 wherein the iron compound is ferric sulfate, the organo sulfur containing compound is sodium dimethyldithiocarbamate, and the alkaline earth metal containing compound is magnesium hydroxide.

5. The process of claim 4 wherein the amount of ferric sulfate is from 2 weight percent to 6 weight percent based upon the weight of the ash treated and the pH is reduced to a pH of 4–5 with a commodity acid if the pH does not reach level upon the addition of the ferric sulfate.

6. The process of claim 5 wherein the alkaline peat moss extract is selected from the group consisting of humic acid, fulvic acid, a blend of humic acid and fulvic acid, and salts thereof.

7. The process of claim 6 wherein the commodity acid is phosphoric acid.

8. The process of claim 7 which comprises an additional step (d) increasing the pH to at least about 9 in the presence of lime.

9. The process of claim 8 wherein the ash stabilized is cupola ash.

* * * * *